United States Patent [19]
Terashima et al.

[11] Patent Number: 5,734,245
[45] Date of Patent: Mar. 31, 1998

[54] POWER WINDOW CONTROL DEVICE

[75] Inventors: Noriaki Terashima, Okazaki; Yoshihisa Sato, Nagoya; Makihiro Ishikawa, Okazaki, all of Japan

[73] Assignee: Nippondenso Co., Ltd., Kariya, Japan

[21] Appl. No.: 570,083

[22] Filed: Dec. 11, 1995

[30] Foreign Application Priority Data

Dec. 13, 1994 [JP] Japan .................................. 6-308701

[51] Int. Cl.$^6$ ..................................................... G05D 3/20
[52] U.S. Cl. .......................... 318/453; 314/455; 314/466; 314/434
[58] Field of Search ............................... 318/280, 291, 318/293, 447, 453, 455, 466, 468, 469, 470, 432–434

[56] References Cited

U.S. PATENT DOCUMENTS

| | | | |
|---|---|---|---|
| 4,870,333 | 9/1989 | Itoh et al. | 318/286 |
| 5,334,876 | 8/1994 | Washeleski et al. | 318/469 X |
| 5,399,950 | 3/1995 | Lu et al. | 318/469 X |
| 5,483,135 | 1/1996 | Parks | 318/469 |
| 5,539,290 | 7/1996 | Lu et al. | 318/469 X |

FOREIGN PATENT DOCUMENTS

| | | |
|---|---|---|
| 60-185625 | 9/1985 | Japan. |
| 64-039278 | 2/1989 | Japan. |

*Primary Examiner*—Brian Sircus
*Attorney, Agent, or Firm*—Cushman Darby & Cushman IP Group of Pillsbury Madison & Sutro LLP

[57] ABSTRACT

When a window glass catches an obstacle and driving current of a driving motor increases to a set maximum value, the driving current is controlled within the maximum set value to limit the obstacle catching force. Because the motor is controlled by a duty ratio of PWM signal, the motor speed can be controlled with ease and stable control of the motor is ensured.

21 Claims, 5 Drawing Sheets

POWER WINDOW CONTROL DEVICE

CROSS REFERENCE TO RELATED APPLICATION

The present application is based on and claims priority from Japanese Patent Application Hei 6-308701 filed on Dec. 13, 1994, the contents of which are incorporated herein by reference.

BACKGROUND OF THE INVENTION

1. Field of the Invention

The present invention relates to a power window control device for a vehicle and, more particularly, to a power window control device having a unit for preventing an obstacle from being caught by a door window of a vehicle.

2. Description of Related Art

U.S. Pat. No. 4,870,333 (which corresponds to Japanese Patent Unexamined publication Sho 63-165682) discloses a power window control having a unit for preventing an obstacle from being caught by a vehicle window glass, in which such obstacle-catch is detected by the rotational speed change of a window driving motor. When the change in the rotational speed becomes a fixed value, the motor stops and rotates in the opposite direction.

However, in the above structure, since the rotational speed of the window driving motor varies with the voltage of an electric driving source, the window is driven to ascend or descend faster when the voltage is high, and slower when the voltage is low. When the voltage of the driving source is high, the kinetic energy of the window increases so that the window applies an increased impact to the obstacle if it is caught by the window. In addition, the driving current of the motor increases rapidly after the window catches the obstacle, thereby increasing a catching force of the obstacle before the motor rotates in the opposite direction to open the window.

SUMMARY OF THE INVENTION

The present invention is made in view of the above problems, and a primary object of the present invention is to provide a power window control device which limits increase of the rush current after obstacle-catch so as to reduce the catching force.

Another object of the present invention is to provide a power window control device which reduces kinetic energy of the window when it closes.

According to the present invention, a power window control device for controlling opening and closing operation of a window glass includes a window glass driving motor, a drive control unit having a circuit generating PWM (pulse, width modulation) signal to control the motor, a current sensor detecting motor driving current, means for setting maximum driving current according to the position of the window glass, means for detecting an obstacle caught by the window glass and means for commanding the drive control unit to limit driving current within the maximum driving current.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

A preferred embodiment will be described with reference to appended drawings hereafter.

Figure 1:
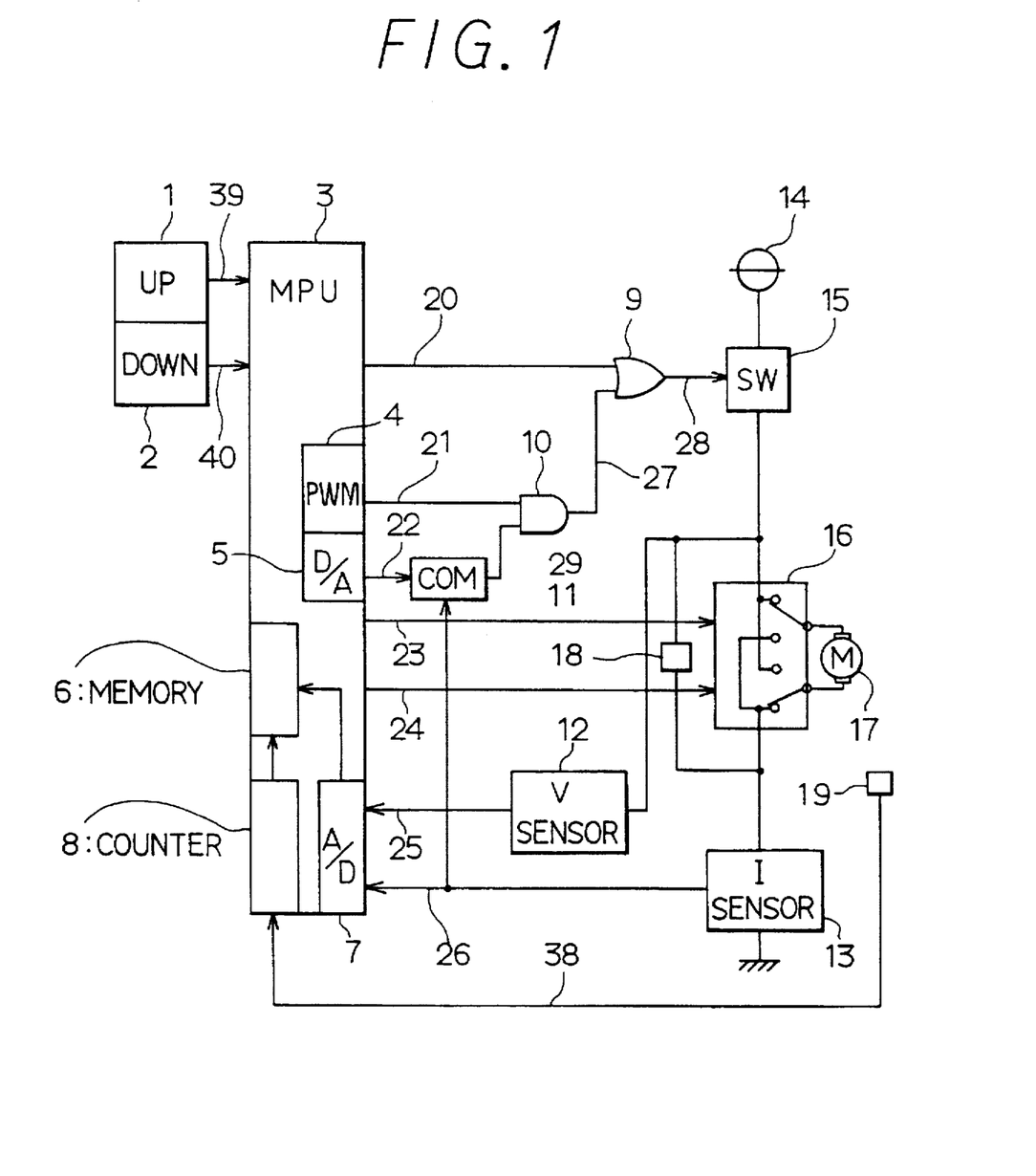
FIG. 1 is an overall circuit diagram of a power window control device according to the embodiment of the present invention.

In FIG. 1, a window-up switch 1 and a window-down switch 2 send an ascent signal 39 and a descent signal 40 to a micro processor unit (hereinafter referred to as MPU) 3 in response to operation of the switches 1 and 2, respectively. Rotating direction of a window driving motor 17 is switched by a relay 16 to open or close the window. The window driving motor 17 provides pulse rotation signals related to the rotating direction. A rotation detector 19 is composed of, for example, a Hall element, which detects the rotation pulse signal of the motor 17 and provides a counter 8 of the MPU 3 with a pulse signal 38.

A switching element 15 supplies or cuts electric current from a battery terminal 14 to the relay 16 in response to an output signal 28 of an OR gate 9. When the signal 28 is a high level voltage (hereinafter referred to as H), the switch element 15 is turned on or brought into the on-state to supply the electric current to the relay 16 from the battery 14.

A voltage sensor 12 detects terminal voltage of the motor 17 (which is almost equal to battery voltage) and provides an A/D converter 7 of the MPU 3 with a signal 25 representing the driving voltage. A current sensor 13 detects driving current of the motor 17 and provides the A/D converter 7 and a comparator 11 with a signal 26 representing the driving current. A flywheel diode 18 releases energy accumulated in the motor 17 when the switching element 15 is turned off.

The MPU 3 includes a microcomputer, a PMW (pulse width modulation) circuit 4, a D/A converter 5, a memory 6, the A/D converter 7 and a counter 8. The A/D converter 7 converts the signal 25 representing the motor driving voltage applied by the voltage sensor 12 and the signal 26 representing the motor driving current applied by the current sensor 13 into digital signals. The counter 8 counts the number of pulses of the pulse signal 38 of the rotation detector 19 to detect the position of the window glass. Since the rotating direction and the rotational speed of the motor are calculated from the counted number of the pulses, the direction (opening or closing), the position, and the speed N of the window glass can be calculated. The relationship between the position of the window glass and the motor driving current and voltage is stored into the memory 6. Incidentally, the counter is reset when the window grass comes to the lowest position or the highest position. (The counter increments as the window glass rises and decrements as the window glass lowers if the counter is reset at the lowest position, and vice versa if the counter is reset at the uppermost position). The MPU 3 receives the ascent signal 39 and the descent signal 40 in addition to the input signals mentioned before and executes programs, which are installed previously, according to all the signals it receives. The MPU 3 sets a maximum driving current (hereinafter referred to as limited current $I_{seigen}$), which is converted by the D/A converter 5 into an analog signal 22 and is applied to the comparator 11. The limited current $I_{seigen}$ is set to correspond to the position of the window glass and to generate catching force to such a degree that the obstacle which is caught between the window glass and the window frame may not get injured.

Figure 2:
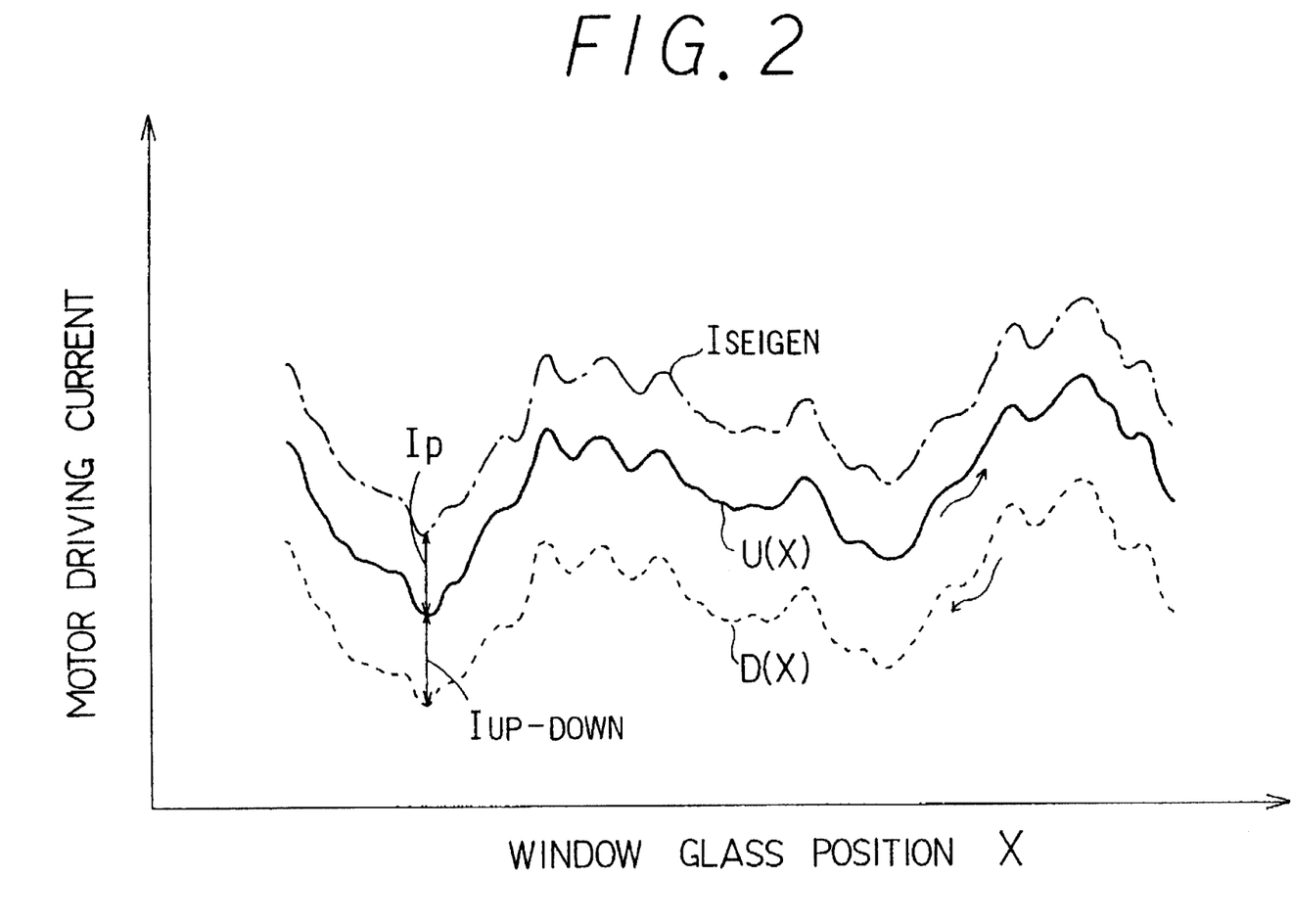
FIG. 2 is a chart showing relationship between driving current of a window driving motor and the position of a window glass.

FIG. 2 shows how to set the limited current $I_{seigen}$.

The position x of the window glass is plotted on the horizontal axis and the driving current of the motor is plotted on the vertical axis. A solid-line curve U(x) indicates the driving current (hereinafter referred to the ascent current) when the window glass ascends, a broken-line curve D(x) indicates the driving current (hereinafter referred to as the descent current) when the window glass descends and a chain-line curve $I_{seigen}$ indicates the limited driving current which is given by adding a fixed value to the descent current D(x).

It is clear from FIG. 2 that the driving current supplied to the motor 17 changes significantly with difference in the gear efficiency of the window regulator disposed between the motor 17 and the window glass. For example, the decent current D(x) changes from 2 A to 6 A and the ascent current changes from 3 A to 8 A. The curves of the descent current D(x) and the ascent current U(x) are very similar to each other, however the current level is different from each other because conditions such as the weight of the window glass and friction of various parts are different between descending and ascending of the window glass. However, as understood from FIG. 2, the ascent current U(x) relative to the window glass position can be readily estimated from the descent current D(x), if no obstacle is present between the window glass and the window frame. In the power window control device according to the present embodiment, the curve of the descent current D(x)(which is very similar to the ascent current except the current level) is detected and stored into the memory 6 every time the window glass is opened so that the ascent current U(x) can be estimated from the latest curve of the descent current D(x), thereby setting the limited driving current $I_{seigen}$.

This relation may be written as the following equation Eq.1:

$$I_{seigen}=D(x)+I_{up-down}+I_p, \text{ where}$$

$I_{up-down}$ is a current value which is a difference between the ascent current U(x) and the descent current D(x), and is determined according to experiment results or calculated from the weight of the window glass, the type of the window regulator and etc, and $I_p$ is a current value corresponding to a current when an obstacle is caught between the window glass and the window frame, and is determined according to experiment results or calculated from the number of turns of an armature winding, magnetic flux of the magnetic field, output efficiency of the motor and the like.

The current of $I_{seigen}$ at the starting position is set comparatively large since the current to start the motor becomes greater than the current to keep the motor running.

If a difference between the signal 26 of the current sensor 13 at a certain position of the window glass and the signal representing the descent current D(x) stored in the memory 6 at the same position of the window glass is less than a fixed value, the current value $I_{up-down}$ of the equation Eq. 1 can be replaced with the above difference (the signal 26 - a signal representing D(x)). However, when the pulse signal 21 is sent from the PWM circuit 4 and the switching element 15 is turned on, the difference is calculated according to the signal 26 at a certain position of the window glass and a signal representing the descent current D(x) stored in the memory 6 at the same window glass position.

The MPU 3 generates signals 20, 23 and 24 which correspond to ascending or descending of the window glass when the window-up switch 1 or the window-down switch is turned on down. In more detail, when the window-up switch 1 is turned on, the signals 20 and 23 become L and the signal 24 becomes H. On the other hand when the window-down switch 2 is turned on, the signals 20 and 23 become H and the signal 24 becomes L. The signals 23 and 24 are applied to the relay 16 and the signal 20 is applied to the OR gate 9. When the MPU 3 detects that the window glass is located at the uppermost or the lowest position according to the number of pulses of the signal 38, MPU 3 changes the signal 20 to H to lock the window glass. When the MPU 3 detects, thereafter, that the motor and the window glass are locked according to the rotational speed signal, the MPU 3 renews data of the driving voltage signal 25 and the driving current signal 26 stored in the memory 6. The renewed data are used as lock voltage $E_{LOCK}$ and lock current $I_{LOCK}$. The data are initially set according to the armature resistance of the motor so that the power window control device can be used at the beginning.

The PWM circuit 4 of the MPU 3 provides an AND gate 10 with the pulse signal 21 having a duty ratio D (which is the product of the H(on)-period and the frequency of the signal 21) according to the rotational speed (which is counted by the counter 8) when the window glass is ascending, so that the motor can rotate at an optimum speed. The basic frequency of the pulse signal 21 is set higher than the human audible frequency or higher than 20 KHz, which is sufficiently greater than the natural frequency decided by the time constant of the motor.

The setting of the pulse signal 21 and the operation of the motor 17 are described next. When the motor 17 is driven by the pulse signal 21 having a duty ratio D, the driving voltage of the motor 17 becomes D times (D<1) as high as the voltage of the battery 14 due to switching operation of the switching element 15, and the rotational speed of the motor 17 decreases to a speed corresponding to the duty ratio D. In other words, the ascending speed of the window glass can be changed by changing the duty ratio, for instance, from 30% to 100%. However, when the voltage becomes D times as high as it was (lower than the battery voltage), the lock current of the motor in the locked condition becomes D times (less than 1) as much as it was, and, therefore, sufficient driving current may not be supplied to drive the window glass.

In the power window control device according to the present embodiment, the duty ratio D is controlled to be not less than a limited duty ratio $D_{seigen}$ which makes the lock current $I_{LOCK}$ not less than the ascent current U(x) (=D(x) +$I_{up-down}$).

Since the lock current $I_{LOCK}$ is proportional to the driving voltage of the motor 17, the following equation is given:

$$E \times D_{seigen}=U(x) \times r,$$

where E is battery voltage and r is a resistance of the armature windings of the motor 17.

Since the resistance $r=E_{LOCK}/I_{LOCK}$, the limited duty ratio $D_{seigen}$ is expressed as the following equation Eq.2:

$$D_{seigen}=(U(x)/I_{LOCK})\times(E_{LOCK}/E)$$

The duty ratio D is set according to the armature windings and the field magnetic flux of the motor 17 or given from experimental results. An ascending speed ND of the window glass which corresponds to the duty ratio D is set beforehand according to the weight of the window glass, the rotational inertia of the motor 17 and so forth, or experimental result.

In order to restrict the kinetic energy of the motor and the window glass while the window glass is ascending, limited motor speeds $N_{seigen}$ are set according to the weight of the window glass and the rotational inertia of the motor 17. The MPU 3 controls the ascending speed N of the window glass within a speed ND so that the motor speed is controlled within $N_{seigen}$.

If a difference (N-ND) between the current speed N of the window glass counted by the counter 8 while the window glass is ascending and the set speed ND thereof when the duty ratio is D is within a fixed value, the MPU 3 can change the duty ratio corresponding to the difference (N-ND).

The relay 16 receives the signals 23 and 24 from the MPU 3 and changes the rotational direction of the motor 17 from opening direction to closing direction of the window and vice versa. The comparator 11 compares the signal 26 from the current sensor 13 and the signal 22 from the MPU 3, and provides the AND gate 10 with an output signal 29. That is, the limited current $I_{seigen}$ and the motor driving current are compared by the comparator 11. The signal 29 becomes H when the signal 22 (corresponding to $I_{seigen}$) is higher than the signal 26 (corresponding to the motor driving current). The AND gate 10 receives the signal 21 from the PWM circuit of the MPU 3 and the signal 29 from the comparator 11 and provides the OR gate 9 with an output signal 27. The OR gate 9 receives the signal 20 from the MPU 3 and the signal 27 from the AND gate 10 and provides the switching element 5 with the signal 28.

The operation of the above embodiment is described next.

When the window-up switch 1 is turned on in the window-full-open state, the ascent signal 39 changes to render the signals 20 and 23 to become L and the signal 24 to become H. At the same time, the pulse signal 21 having the duty ratio D is applied to the AND gate 10 and the signal 22 which corresponds to the limited current $I_{seigen}$ is applied to the comparator 11. Since motor driving current is not supplied to the motor 17 at this moment, the level of the signal 22 is higher than that of the driving current signal 26 and the output signal 29 of the comparator 11 becomes H. Since the AND gate 10 receives signal 29 which is H and the pulse signal 21, the signal 27 from the AND gate corresponds to the duty ratio D, and the signal 28 from the OR gate also corresponds the duty ratio D. The switching element 15, therefore, is controlled in a way of the pulse width modulation (PWM-control) and supplies the motor 17 with current from the battery terminal 14 through the switching element 15 and the relay 16 to lift up the window glass. Since response time of the switching element 15 (which switches large amount of current) is not as short as that of the AND gate 10, the OR gate 9, the current sensor 13 or the comparator 11, the driving current supplied to the motor 17 is comparatively stable although the signals 27 and 28 change between H and L. That is, when the switching element 15 is PWM-controlled, the driving current is supplied to the motor 17 continuously, thereby ensuring stable rotation of the motor 17. Since the driving current supplied to the motor 17 is PWM-controlled, the rotational speed can be changed easily.

When an obstacle is caught by the window glass, the motor driving current increases and becomes greater than the limited current $I_{seigen}$, the current sensor 13 sends the comparator 11 the signal 26 which is higher than the signal 22. Accordingly, the comparator 11 provides the AND gate 10 with the L signal 29, thereby to make the signal 27 and the signal 28 become L (signal 20 is L). Thus the switching element 15 is turned off for an instant until the current detected by the current sensor 13 (which flows through the flywheel diode 18) becomes less than $I_{seigen}$. However, the motor keeps running because of the current through the fly wheel diode 18 and the inertia of itself. It is possible for the comparator 11 to have a timer, which allows the motor to drive the window glass with the maximum driving current $I_{seigen}$ for a fixed time period such as a period between 10 milliseconds and 700 milliseconds before providing the AND gate 10 with the L signal 29. It is also possible to provide the comparator 11 with a counter which holds the H signal 29 when the current sensor sends the signal 26 which is higher than the signal 22 until it counts a fixed number of on-off operation of the switching element 15.

Since the motor 17 is PWM-controlled by the MPU 3 and the duty ratio of the control signal is set suitably, the driving force of the motor 17 can be changed easily so that the window glass will not injure the obstacle.

It is possible to change the duty ratio when the window glass approaches the uppermost position or full-closing position in order to reduce the closing speed.

The operation of the embodiment is further described with reference to FIGS. 3, 4 and 5.

Figure 3:
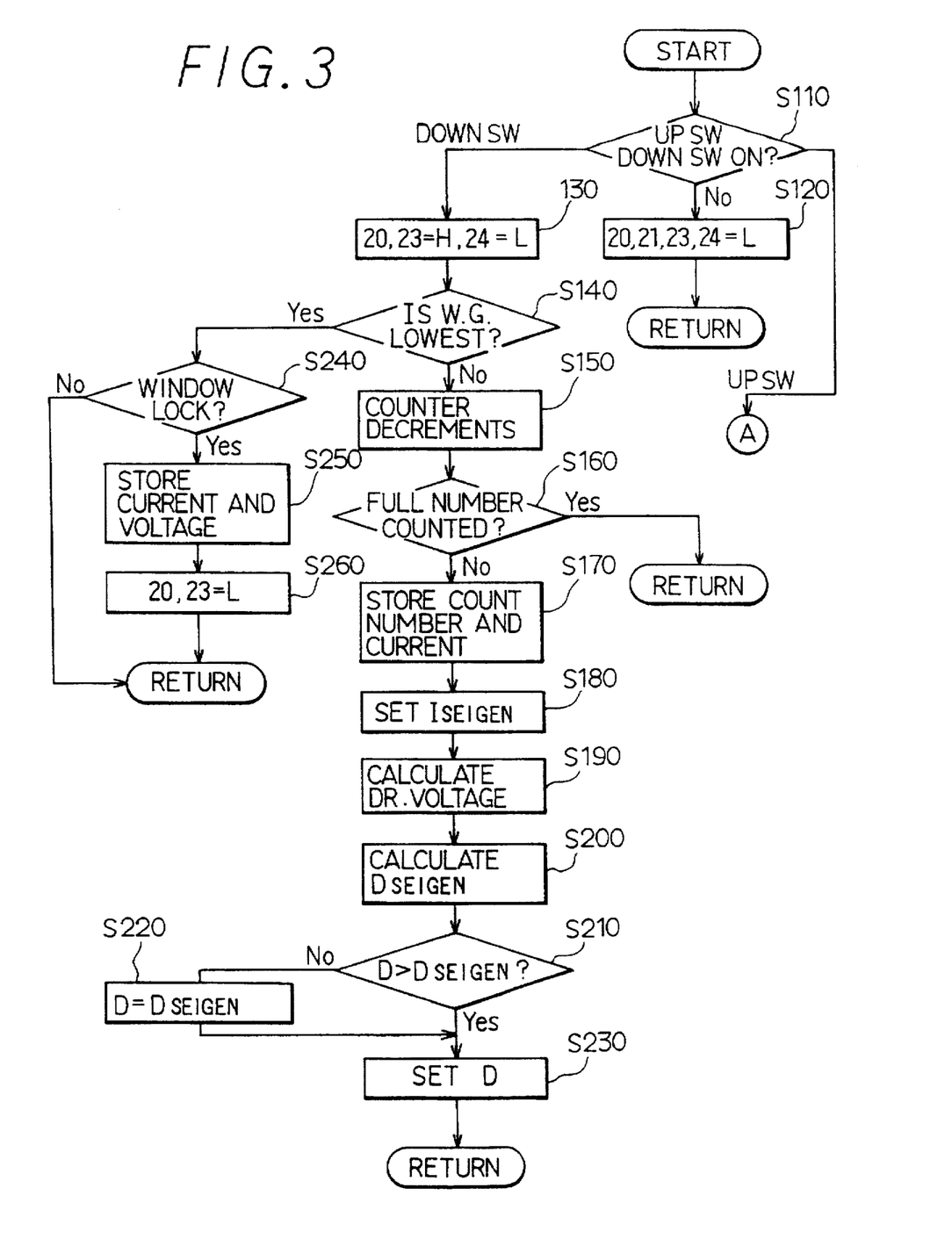
FIG. 3 is a flow chart of a part of the operation program of the power window control device according to the embodiment.
Figure 4:
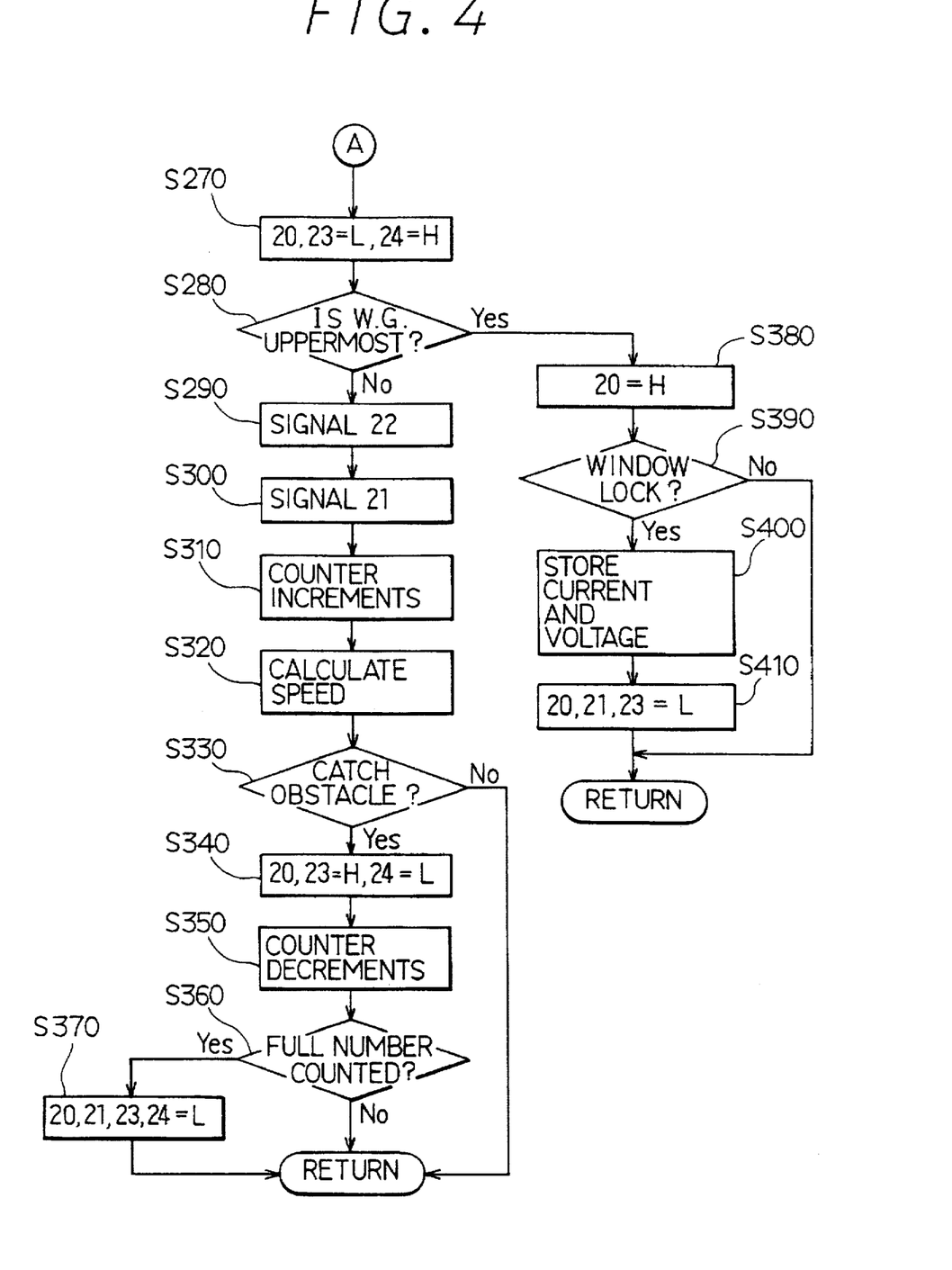
FIG. 4 is a flow chart of a part the of operation program of the power window control device according to the embodiment.

When the MPU 3 is started in a flow chart shown in FIG. 3, the operation of the window-up switch 1 or the window-down switch 2 is detected in a step S110. When none of the switches 1 and 2 is turned on, the signals 20, 21, 23, and 24 are all L which turn on the switching element 15 and the relay 16, and the step of the program returns. When the window-down switch 2 is turned on in the step 110, the signals 20 and 22 are changed to H and the signal 24 maintains L in a step 130 to turn on the switching element 15 and change the relay 16 to the descent position. Whether or not the window glass is located at the lowest position is detected according to a number counted by the counter 8 which counts pulses of the pulse signal 38 (which corresponds to the window glass position) in a step 140. If it is found NO, the counter 8 decrements each time one of the pulse signal 38 is applied to the counter 8. When it is detected in a step 160 that the counter 8 decrements by a fixed number of pulses, the step returns. If detected NO in the step 160, it is decided that the window glass is descending, and the current number of the counter and amount of the driving current are stored into the memory 6. The limited current $I_{seigen}$ relative to the window glass position x is calculated according to the equation Eq.1 and is set in a step 180. The motor driving voltage E is calculated according to the signal 25 from the voltage sensor in a step S 190 to calculate the limited duty ratio $D_{seigen}$ according to the equation Eq.2 in a step 200. If the duty ratio D which is set previously is detected not greater than the limited duty ratio $D_{seigen}$ in a step S 210, the window glass may not be driven to close the window. Therefore, the duty ratio D is renewed as $D=D_{seigen}$ in a step S 220, and the renewed duty ratio D is set in a step S 230. On the other hand, if the duty ratio D is greater than the limited duty ratio $D_{seigen}$ and YES is decided in the step S 210, the duty ratio D is set as it has been in the step S 230. After the setting in the step S 230, the program returns.

When the window glass descends and it is detected that the window glass is located at the lowest position (full open position) in the step S 140, whether or not the window glass stops (or the motor is locked) is detected according to the rotational speed of the motor in a step S 240. If the result is YES, the signal 25 of the driving voltage and the signal 26 of the driving current are stored into the memory 6 (renew the stored data) to be used as the lock voltage $E_{LOCK}$ and the lock current $I_{LOCK}$ in a step S 250. The signals 20 and 23 are changed to L to turn off the switching element 15 and the relay 16 in a step S 260, and the program returns thereafter. On the other hand, if the result in the step S 240 is NO, the program returns without proceeding to the steps S250 and S260.

If the window-up switch 1 is pushed down in the step S110, the program proceeds to a step S 270 (shown in FIG. 4) and renders the signal 20 to be L, the signal 23 to be L to change the relay 16 to the ascent direction, and changes the signal 24 to H. Whether or not the window glass is located at the uppermost position is detected according to the count number of the counter which counts the pulse signal 38 in a step S 280. If the result is NO, the signal 22 which corresponds to the limited current $I_{seigen}$ is applied to the comparator 11 in a step S 290, the signal 21 which corresponds to the duty ratio D set in the step S 230 (shown in FIG. 3) is applied to the AND gate 10, so that the window glass ascends at a speed ND related to the duty ratio D. The counter 8 increments each time one of the pulse signal 38 of the rotation detector 19 is applied thereto in a step S 310, and the ascending speed of the window glass is calculated according to the count number of the counter 8 in a step S 320.

While the window glass is ascending, the obstacle-catch is detected in a step 330. The obstacle-catch is decided, for instance, when the signal 26 (which corresponds to the motor driving current) becomes higher than the signal 24 (which corresponds to the limited current $I_{seigen}$) and maintains such a high level for a fixed time period.

When the driving current of the motor 17 becomes greater than the limited current $I_{seigen}$, the signal 29 of the comparator 11 becomes L and, accordingly, the signal 27 of the AND gate and the signal 28 of the OR gate 10 become L to turn off the switching element 15. Therefore, the motor driving current will not become greater than the limited current even though the window glass catches the obstacle.

When the obstacle-catch is detected in the step 330, the signals 20 and 23 are changed to H and the signal 24 is changed to L to turn on the switching element and change the relay 16 to the descent direction in a step 340. The counter 8 decrements each time a pulse of the pulse signal 38 of the rotation detector 19 is applied thereto in a step 350. When the counter number (which corresponds to the window glass position) becomes a fixed number, YES is decided in a step 360 and the signals 20, 21, 23 and 24 are rendered to be L to stop the motor running in a step S 370, and the program returns thereafter. On the other hand, when No is decided in the step S 360, the program returns thereafter.

If YES is decided in the step 280, the signal 20 is forcibly rendered to be H to render the signal 28 to be H in a step S 380, and whether or not the window glass is stopped from the motion thereof (whether or not the motor is locked) is detected in a step S 390. When YES is decided in the step S 390, the signal 25 (which corresponds to the motor driving voltage) and the signal 26 (which corresponds to the motor driving current) are stored into the memory 6 in a step 400. Subsequently, the signals 20, 21, and 23 are rendered to be L to turn off the switching element 15 and the relay 16 in a step S 410, and the program returns thereafter. On the other hand, when NO is decided in the step S 390, the program returns without proceeding to the step 400.

Figure 5:
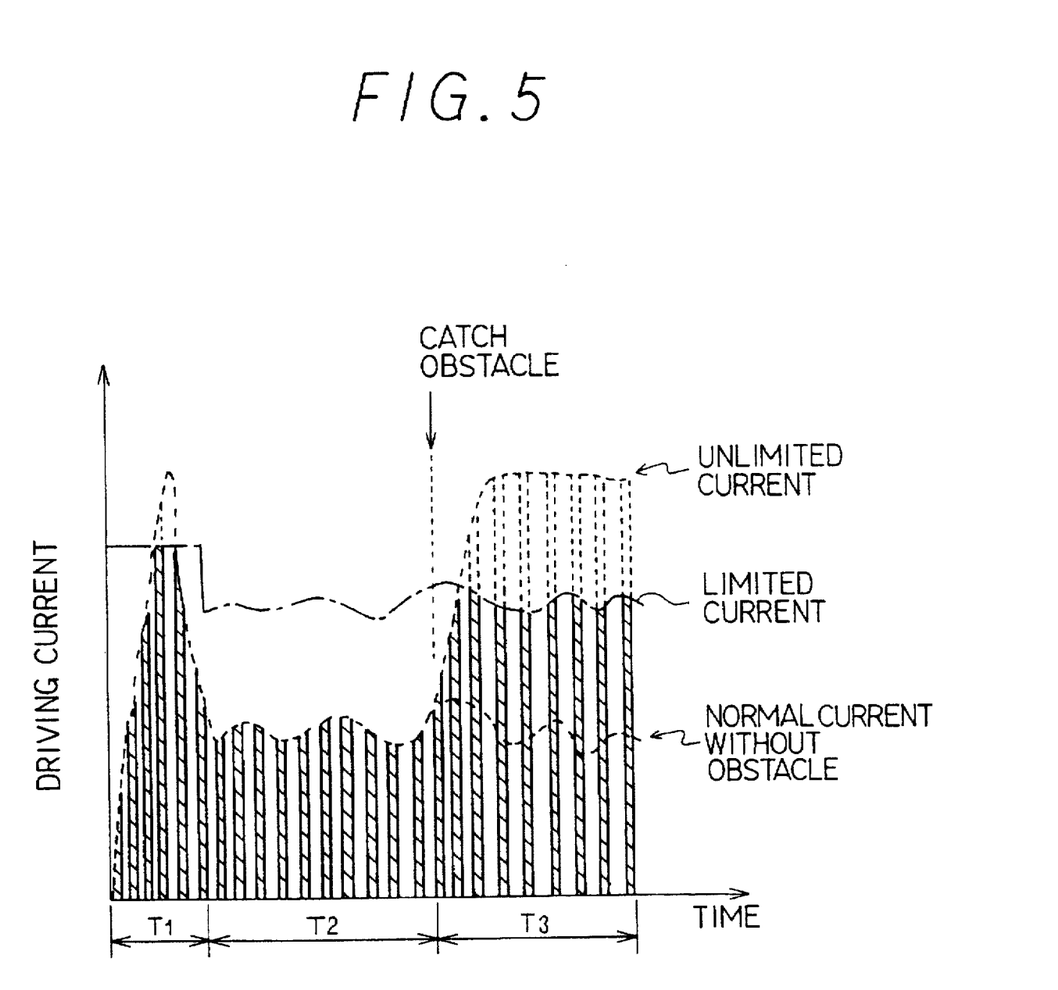
FIG. 5 is a schematic time chart of the driving current of the window driving motor.

In a time chart shown in FIG. 5, the limited current $I_{seigen}$ is given an initial amount for a time T1. When the window-up switch is pushed down at the full open position or the lowest position of the window glass, the limited current $I_{seigen}$ becomes an amount indicated by a chain line which is given by the equation Eq.1 (time period T2). When the window glass catches an obstacle, the motor driving current increases up to the limited current $I_{seigen}$ as indicated by a broken line. However, since the motor driving current will not become greater than the limited current $I_{seigen}$, the catching force is limited so that the obstacle may not get injured.

Since the motor 17 is driven by PWM-controlled current which is schematically indicated by hatching in FIG. 5, highly responsive and highly efficient motor control can be provided.

Since the rotational speed control of the motor 17 is carried out by changing the duty ratio of the signal 21 easily, the catching force of the motor 17 can be adjusted easily according to various conditions such as external disturbances, variations between motors, difference in the window position, change in the battery voltage and/or the like. Such conditions can be detected by the signal 38 of the rotation detector 19 and the signal 25 of the voltage sensor 12.

Further, ascending or descending speed of the window glass, slow or quick starting of the window glass or other control of the window glass can be changed to meet user's preference.

Incidentally, since the motor driving current increases when an obstacle is caught by the window glass, the MPU 3 calculates the rate of change in the motor driving current according to the signal 26 of the current sensor 13 and decides the existence of the obstacle if the rate of change is higher than a fixed threshold value in the step S 330. The MPU 3 can decide the obstacle-catch when the rotational speed of the motor 17 or the rate of change in the rotational speed (which it calculates according to the pulse signal 38 of the rotation detector 19) exceeds a fixed threshold value.

The MPU 3 can be provided with an extra switch to supply the driving current whenever a driver pushes it down intentionally, irrespective of the obstacle catch.

The motor can have various selections of the armature windings (different turn of the armature winding), magnetic flux of the magnetic field, reduction gears or window regulators in order to change the operation speed of the window glass.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A power window control device having a window glass driving unit driven by an electric power source for opening and closing a window glass, said power window control device comprising:

a switching element, connected between said electric power source and said window glass driving unit;

a first means for controlling said switch element to supply said window glass driving unit with modulated driving current, thereby controlling window-closing-speed of said window glass driving unit;

a current sensor for detecting current supplied to said window glass driving unit;

a position sensor for detecting operating position of said window glass driving unit which corresponds to position of the window glass;

second means for setting maximum driving current with respect to window glass position according to the current detected by said current supply sensor and the operating position of said window glass driving unit detected by said position sensor; and third means, connected to said current sensor, for controlling said modulated driving current not to exceed said maximum driving current.

2. A power window control device having a window glass driving unit for opening and closing a window glass, said power window control device comprising:

a switching element connected to an electric power source for supplying said window glass driving unit with driving current;

a drive control unit, having a circuit generating PWM signal connected to said switching element, for controlling motion speed of said window glass driving unit;

a current sensor for detecting driving current of said window glass driving unit;

means for setting maximum driving current with regard to operating position of said window glass driving unit which corresponds to position of the window glass;

means for determining whether an obstacle is caught by said window glass by observing conditions of said window glass driving unit for a fixed time; and means connected to said switching element, for limiting said driving current to said maximum driving current when said driving currents increases to said maximum driving current, wherein said current sensor detects a window opening current supplied to said window glass driving unit when said window glass is opened and a window closing current supplied to said window glass driving unit when said window glass is closed; and said setting means sets said maximum driving current which is given by adding said window opening current a difference between said window opening current and said window closing current and a current corresponding to a permissible marginal current.

3. A power window control device as claimed in claim 2, wherein said setting means sets said maximum driving current every time said window glass is operated.

4. A power window control device as claimed in claim 2, wherein said drive control unit controls said motion speed of said window glass driving unit within a speed determined according to weight of said window glass and inertia of said window glass driving unit.

5. A power window control device as claimed in claim 4 further comprising a voltage sensor for detecting driving voltage of said window glass driving unit, wherein said PWM signal of said drive control unit is a pulse signal having a duty ratio D, which is expressed as follows, $$D > (U(X)/I_{LOCK}) \times (E_{LOCK}/E),$$

where $U(x)$ is a closing current supplied to said window glass driving unit relative to position of said window glass when said window glass closes, $I_{LOCK}$ is a lock current of said driving unit when said window glass is closed and a locked, $E_{LOCK}$ is lock voltage when said window glass is closed and locked and E is motor driving voltage right before said window glass starts closing.

6. A power window control device as claimed in claim 5, said duty ratio D is set smaller when said window glass is located near full-closing position than when said window glass is at other positions.

7. A power window control device as claimed in claim 2, wherein said determining means determines whether said obstacle is caught according to said driving current detected by said current sensor.

8. A power window control device as claimed in claim 2 further comprising a speed sensor for detecting closing speed of said window glass, wherein said determining means determines whether said obstacle is caught according to said closing speed of said window glass.

9. A power window control device as claimed in claim 7 further comprising means for controlling said window glass driving unit to open said window glass when said determining means determines whether said obstacle is caught.

10. A power window control device as claimed in claim 7, wherein said determining means comprises a comparator connected to said current sensor and said maximum driving current setting means and a timer, and determines said obstacle when said timer generates a signal at said fixed time.

11. A power window control device as claimed in claim 2, wherein said timer comprises means for generating clock pulse signals and a counter connected to said pulse signal generating means and determines said obstacle when said counter counts a fixed number of pulses.

12. A power window control device as claimed in claim 8, wherein said speed sensor comprises means for generating pulse signal relative to position of said window glass and a counter connected to said pulse signal generating means for counting said position signal.

13. A power window control device as claimed in claim 12, wherein said window glass driving unit comprises an electric motor and said pulse signal generating means comprises a position sensor for detecting rotational position of said motor.

14. A power window control device as claimed in claim 1 further comprising means for detecting motion speed of said window glass, wherein said drive control unit controls said motion speed of said window glass according to said detected motion speed.

15. A power window control device having a window glass driving unit, including a motor and a relay for changing rotational direction of said motor, for opening and closing said window glass and an electric power source, said power window control device comprising:

a switching element, connected to said electric power source, for switching motor driving current;

a control unit, having a circuit generating PWM signal and connected to said switching element, for controlling said switching element, thereby controlling rotational speed of said motor;

a current sensor for detecting driving current of said motor;

a position sensor for generating signals relative to operating position of said window glass driving unit;

first means, connected to said current sensor and said position sensor, for setting maximum current relative to position of said window glass according to the driving current detected by said current sensor and the signals relative to operating positions of said window glass driving unit;

second means, connected to said current sensor and said first means, for comparing said driving current and said maximum current; and third means, connected to said first means and said second means, for limiting driving current within said maximum current when said window glass is closing and said driving current is greater than said maximum driving current during a fixed time.

16. A power window control device as claimed in claim 15, wherein said third means comprises means for changing said relay to change rotational direction to open said window glass after said third means limits said driving current within said maximum current.

17. A power window control device having a window glass driving unit driven by an electric power source for opening and closing a window glass, said power window control device comprising:

a switching element connected between said electric power source and said window glass driving unit;

a drive control unit, having a circuit generating PWM signal connected to said switching element, for controlling said switching element to supply said window glass driving unit with PWM controlled current, thereby controlling window-closing speed of said window glass driving unit;

a current sensor for detecting current supplied to said window glass driving unit;

a position sensor for detecting operating position of said window glass driving unit;

first means for approximating normal driving current with respect to said operating position of said window glass driving unit;

second means for setting maximum driving current based on said approximated normal driving current; and third means, connected to said current sensor, for limiting said PWM controlled current to said maximum driving current.

18. A power window control device as claimed in claim 17, wherein said current sensor detects window opening current supplied to said window glass driving unit and a window closing current supplied to the window glass; and said maximum driving current is the sum of a difference between said window opening current and said window closing current, a current corresponding to a permissible marginal current and said window opening current.

19. A power window control device as claimed in claim 17 further comprising a voltage sensor for detecting driving voltage of said window glass driving unit, wherein said PWM signal of said drive control unit is a pulse signal having a duty ratio D, which is expressed as follows, $$D > (u(x)/I_{LOCK}) \times (E_{LOCK}/E),$$

where $U(x)$ is a current supplied to said window glass driving unit when said window glass closes, $I_{LOCK}$ is lock current of said driving unit when said window glass is locked, $E_{LOCK}$ is lock voltage when said window glass is locked and E is motor driving voltage right before said window glass starts closing.

20. A power window control device as claimed in claim 17 further comprising means for controlling said window glass driving unit to open said window glass when said third means limiting said PWM controlled current to said maximum driving current.

21. A power window control device as claimed in claim 17, wherein said window glass driving unit comprises an electric motor and a window regulator.

\* \* \* \* \*